(12) United States Patent
Chang

(10) Patent No.: US 9,067,689 B2
(45) Date of Patent: Jun. 30, 2015

(54) AIRCRAFT REFUELING SYSTEM AND METHOD OF REFUELING AN AIRCRAFT

(71) Applicant: The Boeing Company, Seal Beach, CA (US)

(72) Inventor: Kevin Julian Chang, Bothell, WA (US)

(73) Assignee: The Boeing Company, Chicago, IL (US)

( * ) Notice: Subject to any disclaimer, the term of this patent is extended or adjusted under 35 U.S.C. 154(b) by 20 days.

(21) Appl. No.: 14/025,542

(22) Filed: Sep. 12, 2013

(65) Prior Publication Data

US 2014/0319279 A1 Oct. 30, 2014

Related U.S. Application Data

(60) Provisional application No. 61/752,273, filed on Jan. 14, 2013.

(51) Int. Cl.
*B64D 39/00* (2006.01)

(52) U.S. Cl.
CPC ..................................... *B64D 39/00* (2013.01)

(58) Field of Classification Search
USPC .................... 244/135 A, 135 B, 135 R, 1 TD
See application file for complete search history.

(56) References Cited

U.S. PATENT DOCUMENTS

| | | | |
|---|---|---|---|
| 3,285,544 A * | 11/1966 | Chope et al. | 244/135 A |
| 4,158,885 A * | 6/1979 | Neuberger | 701/300 |
| 4,288,845 A | 9/1981 | Finsness et al. | |
| 4,398,685 A * | 8/1983 | Task et al. | 244/135 A |
| 4,633,376 A * | 12/1986 | Newman | 362/470 |
| 5,326,052 A * | 7/1994 | Krispin et al. | 244/135 A |
| 5,499,784 A * | 3/1996 | Crabere et al. | 244/135 A |
| 5,530,650 A * | 6/1996 | Biferno et al. | 701/300 |
| 5,539,624 A * | 7/1996 | Dougherty | 362/556 |
| 5,904,729 A * | 5/1999 | Ruzicka | 701/300 |
| 6,307,207 B1 | 10/2001 | Burbank | |
| 6,644,594 B1 * | 11/2003 | Hunn et al. | 244/135 R |
| 6,832,743 B2 * | 12/2004 | Schneider et al. | 244/135 R |
| 6,935,595 B2 * | 8/2005 | Butsch et al. | 244/135 A |
| 7,021,586 B2 * | 4/2006 | Bolling | 244/135 A |
| 7,036,770 B2 | 5/2006 | Shelly et al. | |
| 7,298,291 B2 * | 11/2007 | von Thal et al. | 340/958 |
| 7,309,048 B2 * | 12/2007 | von Thal et al. | 244/135 A |
| 7,651,054 B2 * | 1/2010 | Roberts et al. | 244/135 A |
| 7,663,506 B2 * | 2/2010 | Lundberg et al. | 340/945 |
| D620,875 S * | 8/2010 | Chang et al. | D12/345 |
| 8,245,973 B2 | 8/2012 | Cote et al. | |
| 8,386,096 B2 * | 2/2013 | Stimac et al. | 701/4 |
| 2005/0017130 A1 * | 1/2005 | Shelly et al. | 244/135 A |
| 2005/0145751 A1 * | 7/2005 | Shelly | 244/135 A |
| 2006/0000949 A1 * | 1/2006 | Schroeder | 244/135 A |
| 2006/0125658 A1 * | 6/2006 | Dohler et al. | 340/951 |
| 2006/0227014 A1 * | 10/2006 | Gannon | 340/972 |
| 2010/0217526 A1 * | 8/2010 | McElveen et al. | 701/300 |
| 2011/0147529 A1 * | 6/2011 | Adarve Lozano | 244/135 A |
| 2011/0266457 A1 | 11/2011 | Lozano | |
| 2012/0168564 A1 * | 7/2012 | Feldmann et al. | 244/135 A |
| 2013/0342372 A1 * | 12/2013 | Stauffer | 340/953 |

\* cited by examiner

*Primary Examiner* — Christopher P Ellis
*Assistant Examiner* — Medhat Badawi
(74) *Attorney, Agent, or Firm* — Armstrong Teasdale LLP

(57) ABSTRACT

An aircraft refueling system for use with a supplying aircraft is provided. The refueling system includes at least two strips of material coupled to a lower portion of the supplying aircraft. The at least two strips are separated by a distance and comprise a material that facilitates the at least two strips becoming progressively visible to a pilot of a receiving aircraft as the receiving aircraft approaches the supplying aircraft.

20 Claims, 6 Drawing Sheets

AIRCRAFT REFUELING SYSTEM AND METHOD OF REFUELING AN AIRCRAFT

CROSS REFERENCE TO RELATED APPLICATIONS

This application claims priority to U.S. Provisional Application No. 61/752,273 filed Jan. 14, 2013, which is hereby incorporated by reference in its entirety.

BACKGROUND

The present disclosure relates generally to aircraft and, more specifically, to in-flight refueling of an aircraft.

At least some known aircraft are capable of being refueled while in flight. In-flight refueling is a strategic operation that enables an aircraft to increase its flight range and its effectiveness when it may not be feasible to land for refueling. In-flight refueling generally requires a supplying aircraft (e.g., a tanker) to maintain a substantially constant flight path, and a receiving aircraft (e.g., a fighter, a bomber, or a transport) to maneuver into a refueling envelope positioned behind and below the supplying aircraft.

In one known method of in-flight refueling, a probe-and-drogue system is used. In such a system, the supplying aircraft extends a fuel hose and an associated drogue therefrom, and the receiving aircraft maneuvers to enable a probe extending from the aircraft to mate with the drogue. During such operations, a closure rate of the receiving aircraft relative to the supplying aircraft is controlled to ensure a solid connection is formed between the probe and drogue. However, during low-light conditions, it may be difficult for the pilot of the receiving aircraft to accurately determine the closure rate and position of the receiving aircraft relative to the supplying aircraft.

In low-light conditions, visible light sources such as light bulbs, black lights, and/or fiber optics may be used to illuminate the exterior of the supplying aircraft. Such limited lighting facilitates the pilot of the receiving aircraft to determine a position of the receiving aircraft relative to the supplying aircraft. However, such lighting systems require wiring, housings, and power sources, for example, to function. Visible light sources may also be detectable to persons on the ground, thereby precluding in-flight refueling during a covert operation. Furthermore, such light sources may interfere with the cockpit lighting and/or decrease the dark-adapted vision of the pilot. For example, pilots often use night visions goggles (NVG) or night vision imaging systems (NVIS) when operating in low-light conditions. Visible light sources may emit infrared energy, which may create a light bloom when viewed through NVG. The light bloom may damage night vision equipment by oversaturating the night vision sensors. Further, when using a light source that is compatible with night vision goggles, the light may not be bright enough to sufficiently illuminate the drogue.

BRIEF DESCRIPTION

In one aspect, an aircraft refueling system for use with a supplying aircraft is provided. The refueling system includes at least two strips of material coupled to a lower portion of the supplying aircraft. The at least two strips are separated by a distance and comprise a material that facilitates the at least two strips becoming progressively visible to a pilot of a receiving aircraft as the receiving aircraft approaches the supplying aircraft.

In another aspect, an aircraft refueling system is provided. The system includes a hose extending downward from a lower portion of a supplying aircraft, wherein a free end of the hose is configured to mate with a fuel receptacle extending from a receiving aircraft. The system also includes a ranging system coupled to the lower portion of the supplying aircraft, the ranging system including self-illuminating material configured to indicate, to a pilot of the receiving aircraft, positioning of the receiving aircraft relative to the supplying aircraft during low-light conditions.

In yet another aspect, a method of refueling a receiving aircraft is provided. The method includes coupling a ranging system to a lower portion of a supplying aircraft, wherein the ranging system includes at least two strips of material separated by a distance. The method also includes positioning, with the ranging system, the receiving aircraft in a refueling position relative to the supplying aircraft. The at least two strips become progressively visible to a pilot of the receiving aircraft as the receiving aircraft approaches the supplying aircraft.

DETAILED DESCRIPTION

Figure 1:
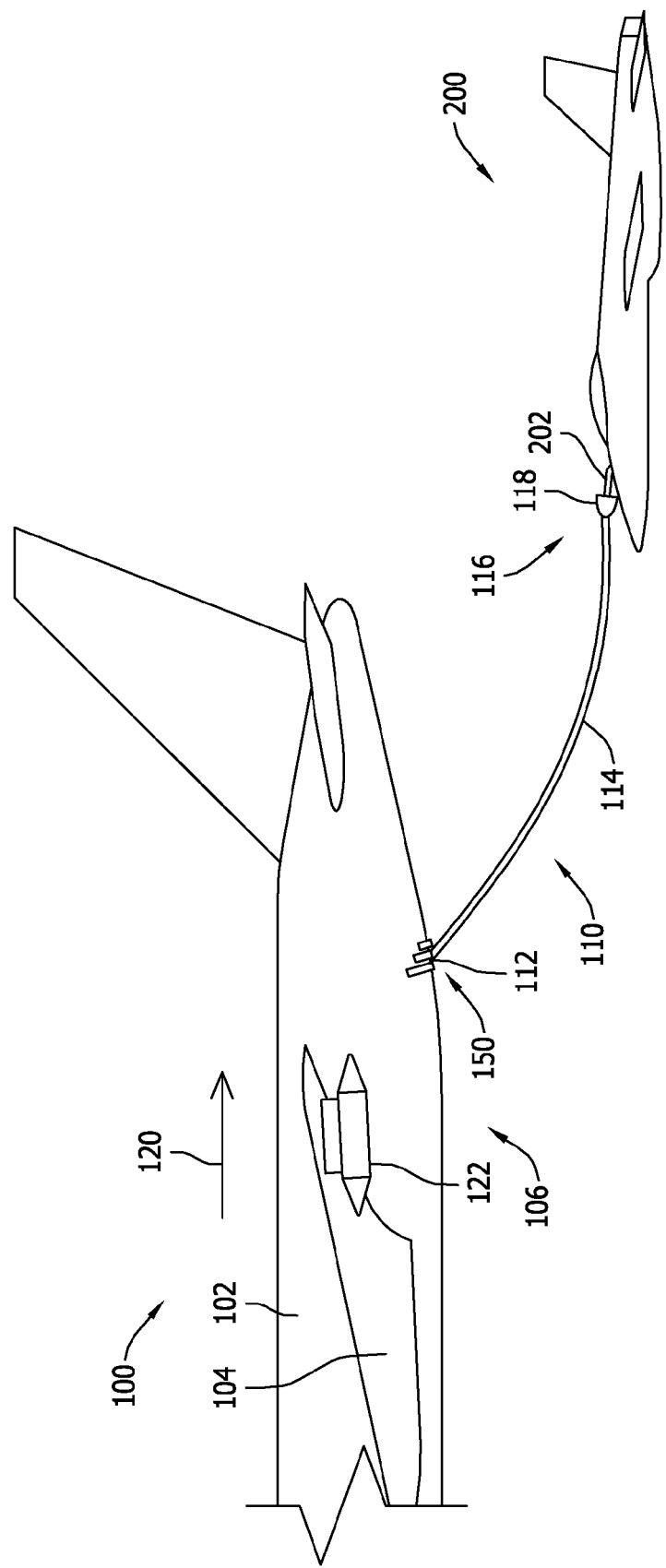
FIG. 1 is a perspective side view of an exemplary supplying aircraft and an exemplary receiving aircraft in an in-flight refueling operation.

Implementations of the present disclosure relate to in-flight refueling systems that facilitate in-flight refueling during low-light conditions. In the exemplary implementation, the refueling system uses a self-illuminating ranging system to indicate, to a pilot of a receiving aircraft, a position of the receiving aircraft relative to a supplying aircraft. Accordingly, the pilot is able to determine the proper closure rate of the receiving aircraft to ensure that a solid engagement is achieved between a refueling probe and drogue, and to facilitate the pilot maintaining a proper distance and holding range from the supplying aircraft during refueling. As used herein, the term "low-light" describes an operating condition where the visibility to a pilot is less than about one-quarter moon, or an overcast night with a light measurement of less than about 1 foot-candle.

In the exemplary implementations, the ranging system includes first, second, and third portions of self-illuminating material positioned adjacent to a hose connector (i.e., and exist tunnel) that is coupled to a lower portion of the supplying aircraft. More specifically, the first portion is coupled aft of the hose connector, the second portion is coupled to extend substantially through a center of the hose connector, and the third portion is coupled forward of the hose connector relative to a longitudinal axis of the supplying aircraft. Accordingly, as a receiving aircraft approaches the supplying aircraft from behind and below the supplying aircraft, the ranging system becomes progressively visible to the pilot of the receiving aircraft even under low-light conditions. For example, none of the portions of self-illuminating material may be visible to the pilot at a first distance from the supplying aircraft, only the first portion may be visible at a second shorter distance, only the first and second portions may be visible at a third even shorter distance, and the first, second, and third portions may be visible at a fourth even shorter distance.

As such, the ranging system enables the pilot to visually determine a proper closure rate and relative position of the receiving aircraft based on the visibility of the self-illuminating material portions, the distance between adjacent self-illuminating material portions, and the relative altitude between the supplying aircraft and receiving aircraft. Further, the exemplary ranging system provides multiple points of reference and a larger area of reference as compared to a single illuminating visible light source such that a pilot may more easily maintain the relative position of the receiving aircraft during refueling.

In the exemplary implementation, the self-illuminating ranging system is fabricated from photo-luminescent material to enable the ranging system to be visible in low-light conditions. Photo-luminescent material emits light in the visible spectrum, and emits substantially no infrared energy such that the ranging system may be compatible with, and/or may be visible without the use of night vision imaging techniques such as image intensification, for example. Further, photo-luminescent material requires no electrical wiring, emits light for hours, and has a low visibility range that enables the material to be used safely during covert operations. Further, using photo-luminescent material substantially eliminates the use of electrically powered components in the fuel split area. Alternatively, any self-illuminating material may be used that enables the system to function as described herein.

FIG. 1 is a perspective side view of an exemplary supplying aircraft 100 and an exemplary receiving aircraft 200 in an in-flight refueling operation. In the exemplary implementation, aircraft 100 includes a fuselage 102 that extends in a downstream direction 120, a wing 104 that extends in a transverse direction from fuselage 102 relative to downstream direction 120, and a lower portion 106. As used herein, the term "lower portion" refers to a lower half of fuselage 102 and/or a pressure side of wing 104.

Supplying aircraft 100 also includes a refueling system 110 that enables in-flight refueling of receiving aircraft 200. In the exemplary implementation, refueling system 110 includes a hose connector 112 that is coupled to lower portion 106, a retractable hose 114 that extends from hose connector 112, and a drogue 118 that is coupled to a free end 116 of hose 114. In addition, receiving aircraft 200 includes a probe 202 that extends therefrom that is configured to mate with drogue 118 such that fuel may be supplied from supplying aircraft 100 to receiving aircraft 200.

In some implementations, supplying aircraft 100 includes a fuel pod 122 that is coupled to an underside of wing 104. In an alternative embodiment, fuel pod 122 may include refueling system 110 such that retractable hose 114 may extend from fuel pod 122. Further, supplying aircraft 100 may use any refueling system 110 that enables supplying aircraft 100 to function as described herein. Exemplary refueling systems include, but are not limited to, a flying boom system, a wing-to-wing system, and a grappling system.

Figure 2:
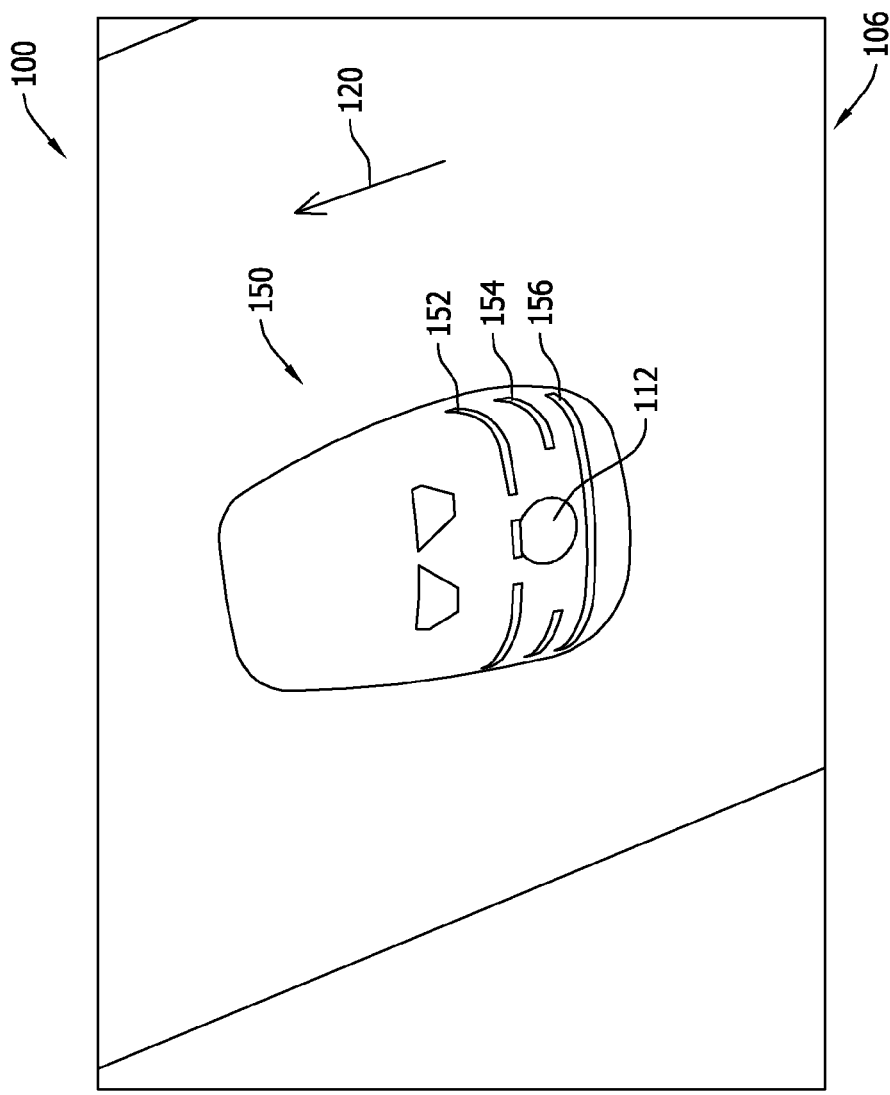
FIG. 2 is a perspective view of an exemplary refueling system that may be used with the supplying aircraft shown in FIG. 1.
Figure 3:
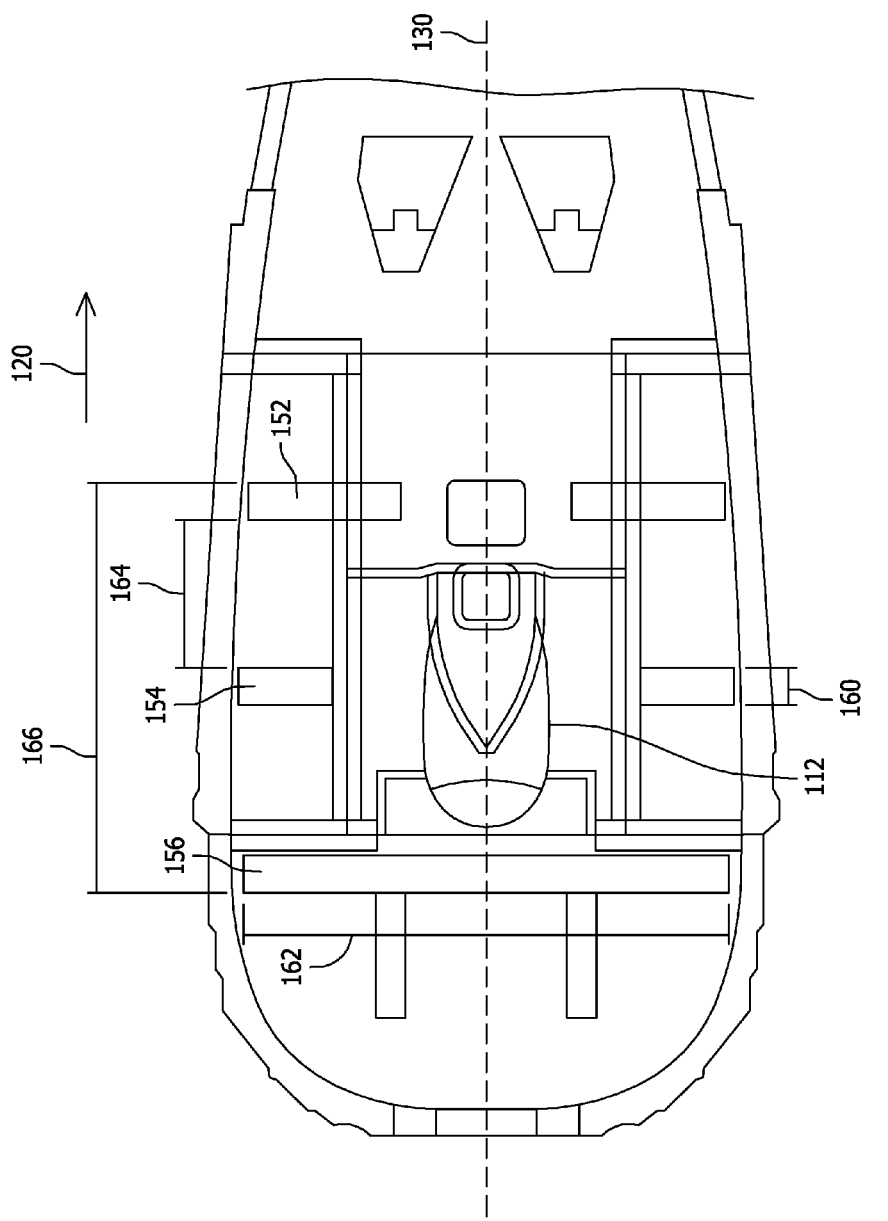
FIG. 3 is an enlarged view of an exemplary ranging system that may be used with the supplying aircraft shown in FIG. 1.

FIG. 2 is a perspective view of refueling system 110, and FIG. 3 is an enlarged view of an exemplary ranging system 150 that may be used with supplying aircraft 100. In the exemplary implementation, ranging system 150 facilitates providing a pilot of receiving aircraft 200 (shown in FIG. 1) with visual cues that enable the pilot to determine a closure rate and position of receiving aircraft 200 relative to supplying aircraft 100. In the exemplary implementation, ranging system 150 includes a first strip 152 of photo-luminescent material, a second strip 154 of photo-luminescent material that is upstream from first strip 152, and a third strip 156 of photo-luminescent material that is upstream from second strip 154. More specifically, second strip 154 is positioned, with respect to a longitudinal axis 130, at about the same axial location as hose connector 112, first strip 152 is positioned aft of hose connector 112 with respect to longitudinal axis 130, and third strip 156 is positioned forward of hose connector 112 with respect to longitudinal axis 130. In an alternative embodiment, ranging system 150 may be coupled to a lower portion of wing 104 and positioned adjacent to fuel pod 122 (shown in FIG. 1) such that the pilot of receiving aircraft 200 may determine a relative position of receiving aircraft 200 to fuel pod 122.

Strips 152, 154, and 156 may have any shape and/or dimensions that enable ranging system 150 to function as described herein. For example, strips 152, 154, and 156 may have any shape and size that enables visible detection of strips 152, 154, and 156 by the pilot of receiving aircraft 200 (shown in FIG. 1) during refueling, and that facilitates reducing drag induced upon supplying aircraft 100. In any of the various implementations of the present disclosure, strips 152, 154, and 156 have a width 160 within a range defined between about 10.0 millimeters (mm) and about 200 mm, and a thickness (not shown) within a range defined between about 1.0 mm and about 10.0 mm. In one implementation, strips 152, 154, and 156 have a width 160 of about 101.6 mm, and a thickness of about 5.0 mm.

Further, strips 152, 154, and 156 extend across lower portion 106 of supplying aircraft 100 in a transverse direction with respect to longitudinal axis 130 at any length that enables ranging system 150 to function as described herein. In the exemplary implementation, strip 156 is a single solid strip, and each of strips 152 and 154 are truncated such that strips 154 and 156 may be positioned about hose connector 112. As such, strips 152, 154, and 156 extend across lower portion 106 at a length 162 within a range defined between about 0.5 meters (m) and about 3.0 m. In one implementation, length 162 is about 1.4 m.

Strips 152, 154, and 156 are also spaced from each other at any distance that enables ranging system 150 to function as described herein. In any of the various implementations of the present disclosure, first strip 152 is separated from second strip 154 by a distance 164 that is within a range defined between about 250 mm to about 2.0 m. In one implementation, distance 164 is about 584 mm. Further strips 152 and 156 may be spaced from each other at any distance that enables ranging system 150 to function as described herein. In any of the various implementations of the present disclosure, first strip 152 is separated from third strip 156 such that an axial length 166 of ranging system is within a range defined between about 0.5 m and about 3.0 m. In one implementation, length 166 is about 1.27 m.

In the exemplary implementations, strips 152, 154, and 156 are fabricated from photo-luminescent material to enable use of ranging system 150 under low-light conditions. When light energy is absorbed by a material, a transient situation occurs in which some, or all, of the localized electrons are promoted into higher energy states. Such electromagnetic excitation is temporary, and the material relaxes back to its lowest excited electronic energy state after a period of time. Relaxation of the electrons back to the ground state results in photonic emission of light for extended periods of time after the excitation source is removed. This process is referred to as photoluminescence.

Strips 152, 154, and 156 may be fabricated from any photo-luminescent material that enables ranging system 150 to function as described herein. An exemplary photo-luminescent material includes, but is not limited to, SrAl$_2$O$_4$:Eu (doped strontium aluminate), which emits green/yellow light. Doped strontium aluminate has a peak-charging sensitivity at a wavelength of about 360 nanometers (nm), an emissions spectrum peak at a wavelength of about 520 nm, and a luminous intensity within a range defined between about 380 and 450 millicandelas (mcd) per square meter after 10 minutes of daylight charging. As such, doped strontium aluminate is compatible with or without the use of night vision goggles, which are sensitive to infrared light sources having a wavelength of from about 660 nm to about 960 nm.

Further, the photo-luminescent material used herein may have an emission time of greater than about 8 hours and is generally undetectable to the unaided eye beyond about 100 m. Accordingly, ranging system 150 may effectively self-illuminate throughout the duration of the night, and generally will not be visible to persons on the ground. Furthermore, ranging system 150 may emit light in a spectrum that enables the use of Class B/C NVIS equipment.

Figure 4:
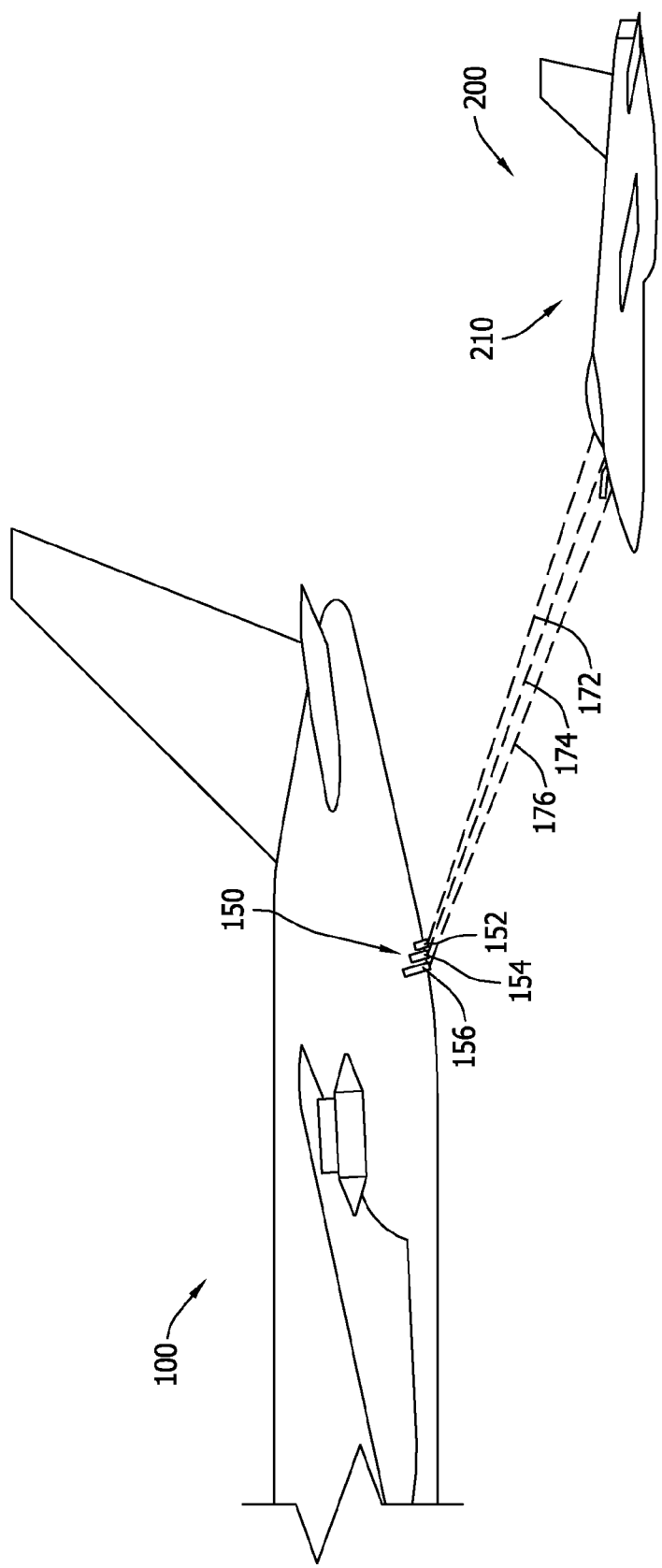
FIG. 4 is a perspective side view of the receiving aircraft shown in FIG. 1 and in a first refueling position.
Figure 5:
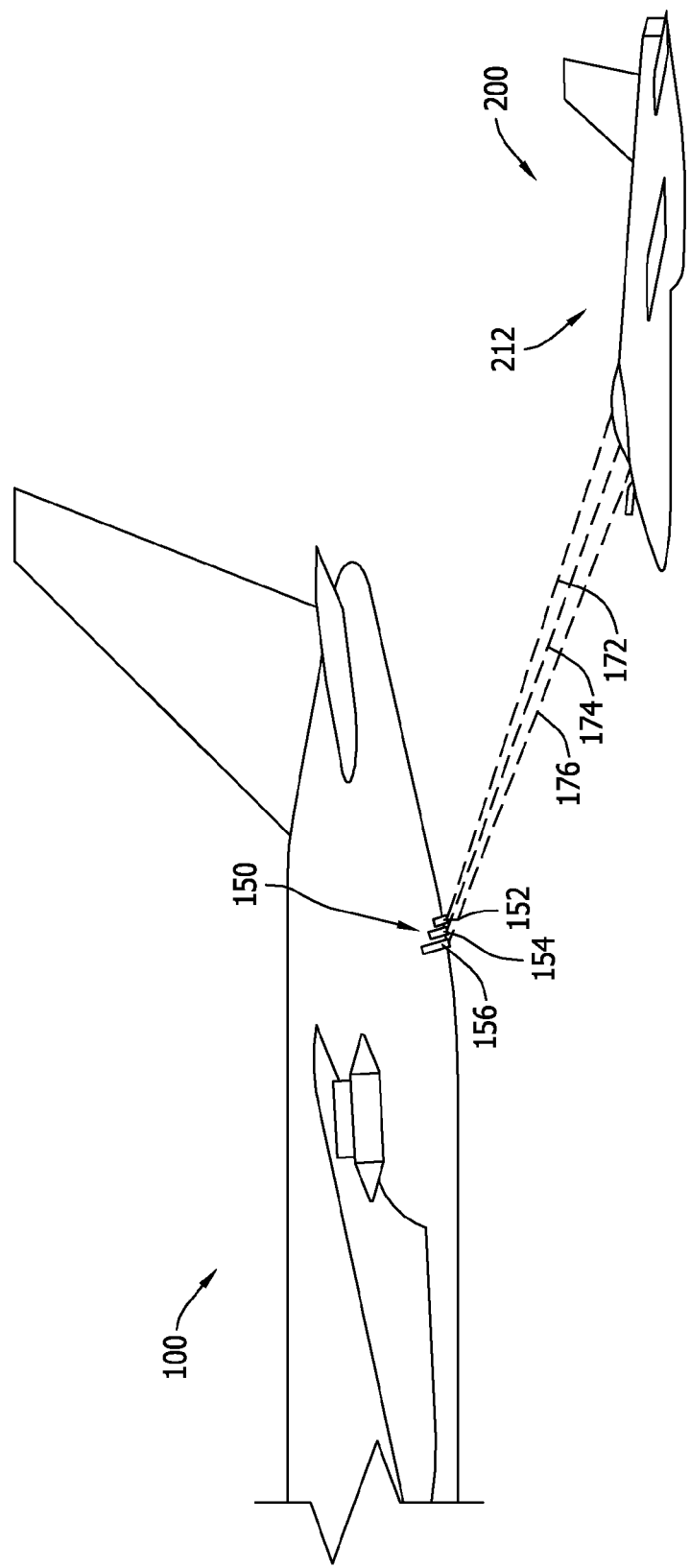
FIG. 5 is a perspective side view of the receiving aircraft shown in FIG. 1 and in a second refueling position.
Figure 6:
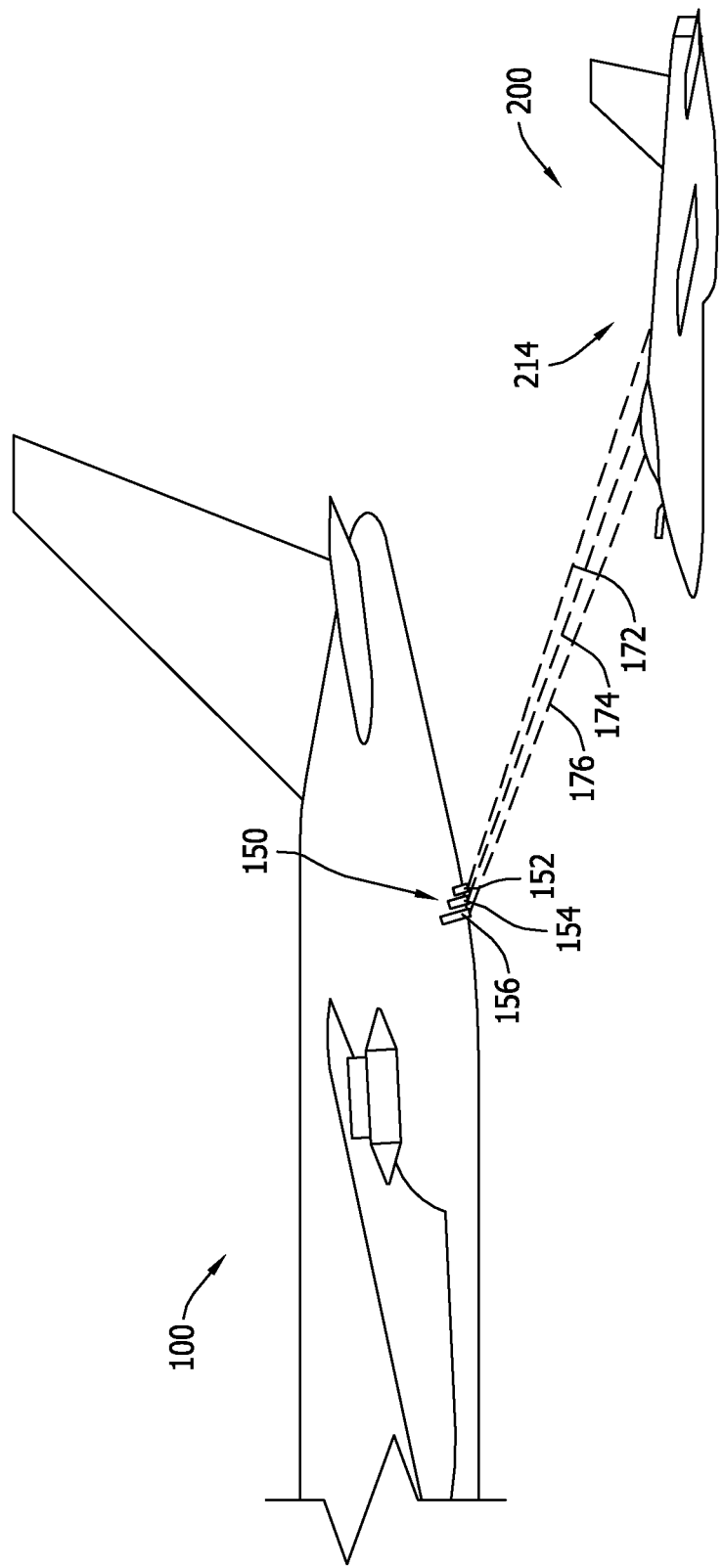
FIG. 6 is a perspective side view of the receiving aircraft shown in FIG. 1 and in a third refueling position.

FIGS. 4-6 are perspective side views of receiving aircraft 200 in a first refueling position 210, in a second refueling position 212, and in a third refueling position 214. As described above, ranging system 150 is only visible to the pilot of receiving aircraft 200 when receiving aircraft 200 is positioned a specified distance from supplying aircraft 100. More specifically, strips 152, 154, and 156 are spaced from each other such that strips 152, 154, and 156 become progressively visible to a pilot of receiving aircraft 200 as receiving aircraft 200 approaches supplying aircraft 100. For example, only first strip 152 is within visible range 172 when receiving aircraft 200 is in first refueling position 210, both first strip 152 is within visible range 172 and second strip 154 is within visible range 174 when receiving aircraft 200 is in second refueling position 212, and each of strips 152, 154, and 156 are within visible ranges 172, 174, and 176 when receiving aircraft 200 is in third refueling position 214.

Further, the visibility of strips 152, 154, and 156 may be used to indicate a closure rate and/or position of receiving aircraft 200 relative to supplying aircraft 100. For example, when distance 164 (shown in FIG. 3) between strips 152, 154, and 156 is known, the rate at which strips 152, 154, and 156 come into visual range may be used to determine the closure rate of receiving aircraft 200. As such, a proper closure rate of about 2 knots may be maintained to enable solid engagement between drogue 118 and probe 202 (shown in FIG. 1).

Further, the relative position of receiving aircraft 200 may be determined by determining how many of strips 152, 154, and 156 are visible to the receiving aircraft pilot. For example, if no strips are within visible range of the pilot of receiving aircraft 200, it may be an indication that receiving aircraft 200 should be maneuvered closer to supplying aircraft 100 to facilitate in-flight refueling. When receiving aircraft 200 is in first refueling position 210, it may be an indication that retractable hose 114 (shown in FIG. 1) is fully extended and that receiving aircraft 200 should approach supplying aircraft 100 to facilitate in-flight refueling. When receiving aircraft 200 is in second refueling position 212, it may be an indication that receiving aircraft 200 is nearly in the proper refueling position relative to supplying aircraft 100. When receiving aircraft 200 is in third refueling position 214, it may be an indication that receiving aircraft 200 is in a proper position relative to supplying aircraft 100, and that in-flight refueling may begin. Further, once in-flight refueling has begun, the pilot of receiving aircraft 200 may use strips 152, 154, and 156 as visual cues to maintain a proper position of receiving aircraft 200 relative to supplying aircraft 100 such that refueling may be maintained.

The refueling systems and ranging systems described herein enable a pilot of a receiving aircraft to determine a position of the receiving aircraft relative to a supplying aircraft even in low-light conditions. In the exemplary implementations, the ranging system is fabricated from self-illuminating material, such as photo-luminescent material, such that the ranging system is compatible with or without the use of night vision goggles, and such that the ranging system is only visible to the pilot. Further, the ranging system includes two or more transversely-oriented, self-illuminating strips that become progressively visible to the pilot as the receiving aircraft approaches the supplying aircraft. As such, the pilot is able to determine a proper closure rate of the receiving aircraft that will facilitate in-flight refueling, and the ranging system provides a larger frame of reference on the supplying aircraft such that the pilot can maintain a proper position of the receiving aircraft during refueling.

It should be appreciated that implementations of the present disclosure may be applied to any suitable supplying aircraft, and is not limited to the supplying aircraft shown in the present figures. Further, it should be appreciated that the shape, size, and/or configuration of implementations of the exemplary ranging system may vary based on the configuration of the supplying aircraft.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An aircraft refueling system for use with a supplying aircraft, said refueling system comprising:
   at least two strips of material coupled to a lower portion of the supplying aircraft, said at least two strips are separated by a distance and comprise a material that facilitates said at least two strips becoming progressively visible to a pilot of a receiving aircraft as the receiving aircraft approaches the supplying aircraft;
   wherein said at least two strips comprising a first strip and a second strip, wherein only said first strip is visible to the receiving aircraft pilot when the receiving aircraft is in a first position relative to the supplying aircraft, and wherein said first strip and said second strip are visible to the receiving aircraft pilot when the receiving aircraft is in a second position relative to the supplying aircraft.

2. The refueling system in accordance with claim 1, wherein said at least two strips are formed from self-illuminating material.

3. The refueling system in accordance with claim 1, wherein said
   first strip extends substantially through a center of a hose connector coupled to the lower portion of the supplying aircraft; and
   said second strip is positioned at one of aft of said first strip and forward of said first strip.

4. The refueling system in accordance with claim 1, wherein said at least two strips extend transversely relative to a longitudinal axis of the supplying aircraft.

5. The refueling system in accordance with claim 1, wherein said at least two strips are configured to become progressively visible to the pilot as the receiving aircraft approaches the supplying aircraft from below and aft of the supplying aircraft.

6. The refueling system in accordance with claim 1, wherein a rate at which said at least two strips become progressively visible to the pilot is associated with a closure rate of the receiving aircraft relative to the supplying aircraft.

7. The refueling system in accordance with claim 1, wherein said at least two strips are configured to indicate a proper refueling position of the receiving aircraft when each said at least two strips are visible to the pilot of the receiving aircraft.

8. An aircraft refueling system comprising:
a hose extending downward from a lower portion of a supplying aircraft, wherein a free end of said hose is configured to mate with a fuel receptacle extending from a receiving aircraft; and
a ranging system coupled to the lower portion of the supplying aircraft, said ranging system comprising self-illuminating material configured to indicate, to a pilot of the receiving aircraft, positioning of the receiving aircraft relative to the supplying aircraft during low-light conditions, wherein only a first portion of said ranging system is visible to the receiving aircraft pilot when the receiving aircraft is a first distance from the supplying aircraft, and wherein said first portion and a second portion of said ranging system are visible to the receiving aircraft pilot when the receiving aircraft is a second distance from the supplying aircraft, the second distance being shorter than the first distance.

9. The aircraft refueling system in accordance with claim 8, wherein the self-illuminating material comprises photo-luminescent material.

10. The aircraft refueling system in accordance with claim 8, wherein the self-illuminating material is configured to be compatible with night vision imaging techniques.

11. The aircraft refueling system in accordance with claim 8, wherein said first portion and said second portion of said ranging system are configured to be progressively visible to the pilot of a receiving aircraft as the receiving aircraft approaches the supplying aircraft.

12. The aircraft refueling system in accordance with claim 8, wherein said ranging system is configured to indicate a proper refueling position of the receiving aircraft based on which portions of said first portion and said second portion of said ranging system are visible to the pilot at a current position of the receiving aircraft.

13. The aircraft refueling system in accordance with claim 8, wherein said first portion comprises a first strip of self-illuminating material coupled to the lower portion of the supplying aircraft and said second portion comprises a second strip of self-illuminating material coupled to the lower portion of the supplying aircraft, wherein said first strip and said second strip are separated by a distance such that said first strip and said second strip become progressively visible to the pilot of the receiving aircraft as the receiving aircraft approaches the supplying aircraft.

14. The aircraft refueling system in accordance with claim 8, wherein said ranging system indicates a proper refueling position of the receiving aircraft when said first portion and said second portion of said ranging system are visible to the pilot at a current position of the receiving aircraft.

15. A method of refueling an aircraft, said method comprising:
coupling a ranging system to a lower portion of a supplying aircraft, wherein the ranging system includes at least two strips of material separated by a distance, wherein the at least two strips include a first strip and a second strip, only the first strip being visible to the receiving aircraft pilot when the receiving aircraft is in a first position relative to the supplying aircraft, and wherein the first strip and the second strip are visible to the receiving aircraft pilot when the receiving aircraft is in a second position relative to the supplying aircraft; and
positioning, with the ranging system, the receiving aircraft in a refueling position relative to the supplying aircraft, wherein the at least two strips become progressively visible to a pilot of the receiving aircraft as the receiving aircraft approaches the supplying aircraft.

16. The method in accordance with claim 15, wherein coupling a ranging system comprises extending the at least two strips in transverse direction relative to a longitudinal axis of the supplying aircraft.

17. The method in accordance with claim 15, wherein coupling a ranging system comprises separating the at least two strips by the distance that extends along a longitudinal axis of the supplying aircraft.

18. The method in accordance with claim 15, wherein positioning the receiving aircraft comprises selecting a closure rate of the receiving aircraft relative to the supplying aircraft based on a rate at which the at least two strips become progressively visible to the pilot.

19. The method in accordance with claim 15, wherein positioning the receiving aircraft comprises selecting the refueling position based on a visibility of the at least two strips to the pilot at a current position of the receiving aircraft.

20. The method in accordance with claim 15 further comprising forming the at least two strips from photo-luminescent material.

* * * * *